(12) United States Patent
Li et al.

(10) Patent No.: US 11,113,529 B2
(45) Date of Patent: Sep. 7, 2021

(54) PHOTOVOLTAIC PANEL RECOGNITION METHOD, GROUND STATION, CONTROL APPARATUS, AND UNMANNED AERIAL VEHICLE

(71) Applicant: SZ DJI TECHNOLOGY CO., LTD., Shenzhen (CN)

(72) Inventors: Zefei Li, Shenzhen (CN); Chao Weng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 48 days.

(21) Appl. No.: 16/725,874

(22) Filed: Dec. 23, 2019

(65) Prior Publication Data

US 2020/0134318 A1 Apr. 30, 2020

Related U.S. Application Data

(63) Continuation of application No. PCT/CN2017/108683, filed on Oct. 31, 2017.

(51) Int. Cl.
*G06K 9/00* (2006.01)
*G06K 9/20* (2006.01)
*G06K 9/46* (2006.01)

(52) U.S. Cl.
CPC ..... *G06K 9/00671* (2013.01); *G06K 9/00637* (2013.01); *G06K 9/2018* (2013.01); *G06K 9/4638* (2013.01); *G06K 2009/00644* (2013.01)

(58) Field of Classification Search
CPC ........... G06K 9/00671; G06K 9/00637; G06K 9/2018; G06K 9/4638; G06K 2009/00644;

(Continued)

(56) References Cited

U.S. PATENT DOCUMENTS

2017/0277966 A1* 9/2017 Abousleman ............. G06T 7/13
2017/0316558 A1* 11/2017 Hori ........................ G06T 7/001

FOREIGN PATENT DOCUMENTS

| CN | 101551851 A | 10/2009 |
|---|---|---|
| CN | 103136531 A | 6/2013 |

(Continued)

OTHER PUBLICATIONS

The World Intellectual Property Organization (WIPO) International Search Report for PCT/CN2017/108683 dated Aug. 3, 2018 8 Pages.

(Continued)

*Primary Examiner* — Tapas Mazumder
(74) *Attorney, Agent, or Firm* — Anova Law Group, PLLC (57) ABSTRACT

A method for identifying a photovoltaic panel includes: acquiring a grayscale image of an infrared image captured by a camera mounted on a UAV, the grayscale image including an image of a photovoltaic panel; performing edge extraction processing on an image in the grayscale image to obtain a monochrome image including a plurality of horizontal lines and a plurality of vertical lines, the horizontal lines being lines in a first direction, an average length of the lines in the first direction being greater than a preset length, the vertical lines being lines in a second direction, and an average length of the lines in the second direction being less than the preset length; and identifying the photovoltaic panel in the monochrome image based on a relative positional relationship between the horizontal lines and the vertical lines in the monochrome image.

18 Claims, 7 Drawing Sheets

(58) Field of Classification Search
CPC ....... Y02E 10/50; H02S 50/15; G06T 7/0002; G06T 7/11; G06T 7/13; G06T 7/136; G06T 7/90
See application file for complete search history.

(56) References Cited

FOREIGN PATENT DOCUMENTS

| | | |
|---|---|---|
| CN | 104952060 A | 9/2015 |
| CN | 105263000 A | 1/2016 |
| CN | 205176658 U | 4/2016 |
| CN | 105678310 A | 6/2016 |
| CN | 105868696 A | 8/2016 |
| GB | 2546564 A | 7/2017 |
| KR | 101660456 B1 | 9/2016 |
| KR | 20160139110 A | 12/2016 |
| WO | 2013101527 A1 | 7/2013 |
| WO | 2017099819 A2 | 6/2017 |
| WO | 2017099819 A3 | 6/2017 |

OTHER PUBLICATIONS

Guowei He, et al., Knowledge-based Railroad's Recognition from Digital Infrared Image, Infrared and Laser Engineering, Dec. 2000, vol. 20, No. 6.

Tao Xia, et al., Contour Tracking for Infrared Image Based on the Characteristic Analysis of the Local Gray Level, Laser & Infrared, Feb. 2006, vol. 36, No. 2.

\* cited by examiner

PHOTOVOLTAIC PANEL RECOGNITION METHOD, GROUND STATION, CONTROL APPARATUS, AND UNMANNED AERIAL VEHICLE

CROSS-REFERENCE TO RELATED APPLICATION

This application is a continuation of International Application No. PCT/CN2017/108683, filed Oct. 31, 2017, the entire content of which is incorporated herein by reference.

TECHNICAL FIELD

The present disclosure relates to the technical field of unmanned aerial vehicle (UAV), and in particular relates to a photovoltaic panel recognition method, an apparatus, and a UAV.

BACKGROUND TECHNOLOGY

A photovoltaic panel is a device that converts light energy into electricity. When it is exposed to sunlight, it collects heat and converts light energy into direct current. Often, also due to its long-term exposure to sunlight, it is more prone to strain and damage.

Existing technologies for maintaining photovoltaic panels generally include two methods: manual inspection and inverter monitoring. The manual inspection requires technicians to regularly visit the project site for inspection, which generates a large workload and the efficiency is low. The inverter monitoring method monitors a total current or voltage of the photovoltaic panels in a certain area in real time. When an abnormality occurs in the current or voltage in the area, it can only be determined that the photovoltaic panels in the area may be malfunctioning and it is impossible to pinpoint which photovoltaic panel is malfunctioning. Accordingly, technicians are still required to go to the site for troubleshooting, and the problem of low efficiency still remains.

SUMMARY OF THE DISCLOSURE

In accordance with the disclosure, there is provided a method for identifying a photovoltaic panel. The method includes: acquiring a grayscale image of an infrared image captured by a camera mounted on a UAV, the grayscale image including an image of a photovoltaic panel; performing edge extraction processing on an image in the grayscale image to obtain a monochrome image including a plurality of horizontal lines and a plurality of vertical lines, the horizontal lines being lines in a first direction, an average length of the lines in the first direction being greater than a preset length, the vertical lines being lines in a second direction, and an average length of the lines in the second direction being less than the preset length; and identifying the photovoltaic panel in the monochrome image based on a relative positional relationship between the horizontal lines and the vertical lines in the monochrome image.

Also in accordance with the disclosure, there is provided a ground station. The ground station includes a communication interface and one or more processors. The communication interface is configured to obtain a grayscale image of an infrared image captured by a camera mounted on the UAV, the grayscale image including an image of a photovoltaic panel. The one or more processors operate individually or in collaboration, and the communication interface is connected to the processor. The processor is configured to: perform edge extraction processing on an image in the grayscale image to obtain a monochrome image including a plurality of horizontal lines and a plurality of vertical lines; and identify the photovoltaic panel in the monochrome image based on a relative position relationship between the horizontal lines and the vertical lines in the monochrome image. The horizontal lines are lines in a first direction, an average length of the lines in the first direction is greater than a preset length, the vertical lines are lines in a second direction, and an average length of the lines in the second direction is less than the preset length.

BRIEF DESCRIPTION OF THE DRAWINGS

FIG. 3b is a monochrome image obtained from the grayscale image shown in FIG. 3a;

DETAILED DESCRIPTION OF THE EMBODIMENTS

The technical solutions in the embodiments of the present disclosure will be clearly described below with reference to the accompanying drawings in the embodiments of the present disclosure. Obviously, the described embodiments are only a portion of the embodiments of the present disclosure, but not all the embodiments. Based on the embodiments of the present disclosure, all other embodiments obtained by a person of ordinary skill in the art without creative efforts shall fall within the protected scope of the present disclosure.

It should be noted that when a component is called "fixed to" another component, it may be directly placed on another component or be placed on an intermediate component which is on the component. When a component is considered to be "connected" to another component, it can be directly connected to another component or a connecting component may exist at the same time.

Unless defined otherwise, all technical and scientific terminology used here have the same meaning as commonly understood by one of ordinary skill in the art to which this disclosure relates. The terminology used in the description of the present disclosure is only for the purpose of describing specific embodiments, and is not intended to limit the present disclosure. The term "and/or" as used herein includes any and all combinations of one or more of the associated listed items.

Hereinafter, some embodiments of the present disclosure will be described in detail with reference to the drawings. When causing no conflicts, the following embodiments and features in the embodiments can be combined with each other.

Figure 1:
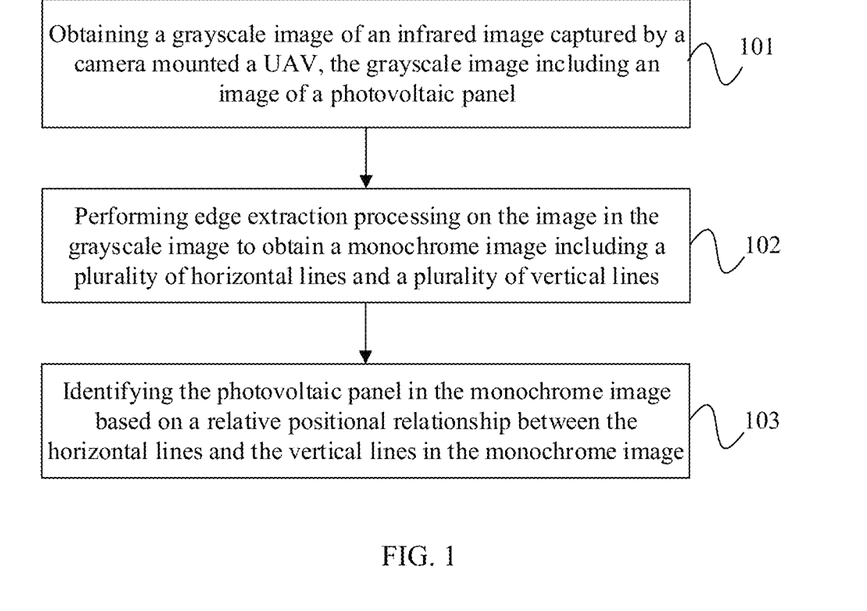
FIG. 1 is a flowchart of a photovoltaic panel recognition method provided by the present disclosure.

According to some embodiment of the present disclosure, a method for identifying a photovoltaic panel is provided. The method may be performed by a ground station or a control apparatus mounted on a UAV. The following embodiments are specifically described by taking a ground station as an example. An execution manner of the control apparatus is similar to that of a ground station, and details are not described in this embodiment. Referring to FIG. 1, FIG. 1 is a flowchart of a photovoltaic panel recognition method provided by the present disclosure. As shown in FIG. 1, the method in this embodiment includes:

Step 101: Obtaining a grayscale image of an infrared image captured by a camera mounted a UAV, the grayscale image including an image of a photovoltaic panel.

The ground station of this embodiment is a device having computing functions and/or processing capacity. Specifically, the device may be: a remote control, a smart phone, a tablet computer, a laptop computer, a watch, a bracelet, etc., and a combination thereof.

Figure 2:
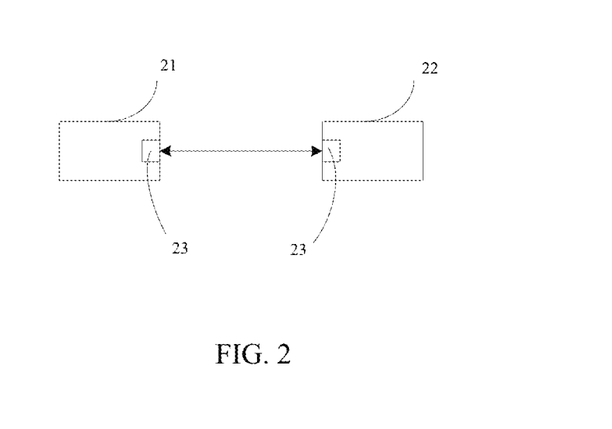
FIG. 2 is a schematic diagram of a connection between a ground station and a UAV consistent with the embodiments of the present disclosure.

As shown in FIG. 2, the ground station 21 and the UAV 22 are connected through an application programming interface (API) 23. Specifically, the ground station 21 and the UAV 22 can be connected wirelessly. For example, they connected in at least one of the following ways: wireless fidelity (Wi-Fi), Bluetooth, software defined radio (SDR), or other custom protocols.

Optionally, in this embodiment, the UAV may automatically cruise in an electric field according to a predetermined route, and the UAV may be controlled to cruise in the electric field by the ground station.

In this embodiment, the UAV carries an infrared camera, and a control apparatus mounted on the UAV or the ground performs image processing on an infrared image captured by the infrared camera to obtain a corresponding grayscale image.

Step 102: Performing edge extraction processing on the image in the grayscale image to obtain a monochrome image including a plurality of horizontal lines and a plurality of vertical lines.

Optionally, according to this embodiment, performing edge extraction processing on the image in the grayscale image to obtain a monochrome image including a plurality of horizontal lines and a plurality of vertical lines includes: based on a preset segmentation template, a portion of the grayscale image having a grayscale value greater than a preset threshold may be set to white, and a portion of the grayscale image having a grayscale value less than the preset threshold may be set to black, to obtain a monochrome image including multiple horizontal lines and vertical lines. In this embodiment, a direction of the horizontal line is defined as a first direction, and an average length of the lines in the first direction is greater than a preset length. In this embodiment, a direction of the vertical line is defined as a second direction, and an average length of the lines in the second direction is smaller than the preset length.

Figure 3A:
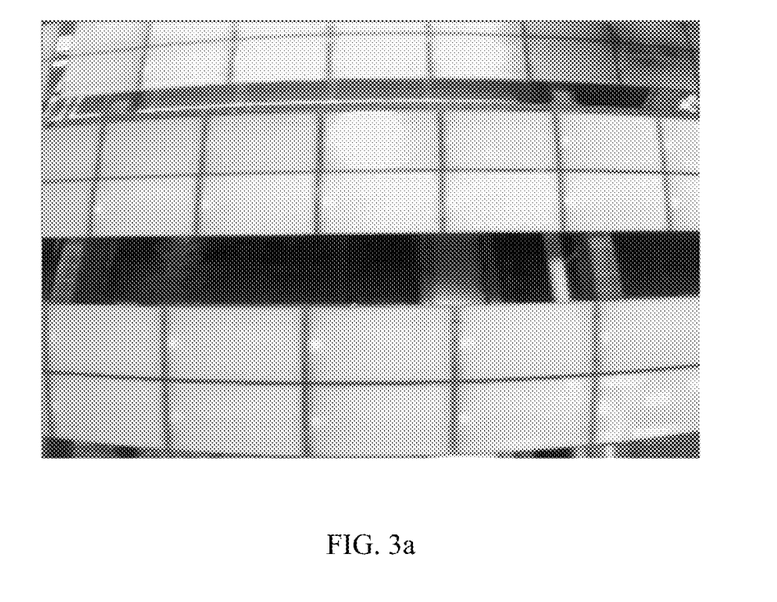
FIG. 3a is a grayscale image of an infrared image captured by a UAV according to some embodiment of the present disclosure.
Figure 3B:
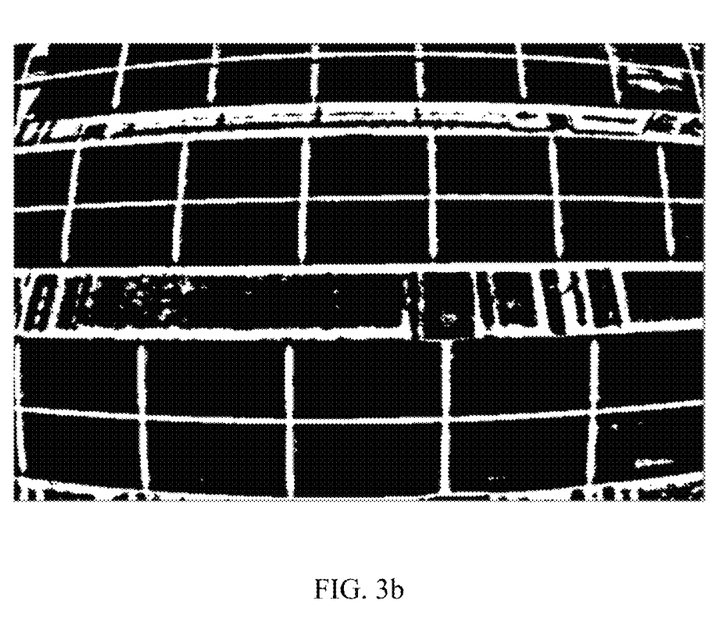

For example, FIG. 3a is a grayscale image of an infrared image captured by a UAV according to some embodiment of the present disclosure. Based on FIG. 3a, an adaptive binary segmentation method is implemented to extract black lines in FIG. 3a to obtain a monochrome image as shown in FIG. 3a. For example, a segmentation template having a size of 21*21 may be used to traverse the entire monochrome image, a portion having a gray value greater than or equal to the segmentation threshold (that is, the preset threshold), −5, is set to white, and a portion having a gray value smaller than −5 is set to black. Accordingly, a monochrome image as shown in FIG. 3b can be obtained. Of course, only a 21*21 segmentation template and a preset threshold of −5 are taken here for illustration, but they are not the specific limitation on the method to obtain the monochrome image. In fact, in actual scenarios, different segmentation templates and different preset thresholds can be used to obtain the required monochrome image.

A plurality of white horizontal lines and white vertical lines are included in FIG. 3b. These white lines represent edges of the image in the grayscale image, which includes edges of a photovoltaic panel image. The purpose of this embodiment is to determine the edges of the photovoltaic panel from these horizontal and vertical lines, so as to identify the photovoltaic panel from the monochrome image.

Figure 3C:
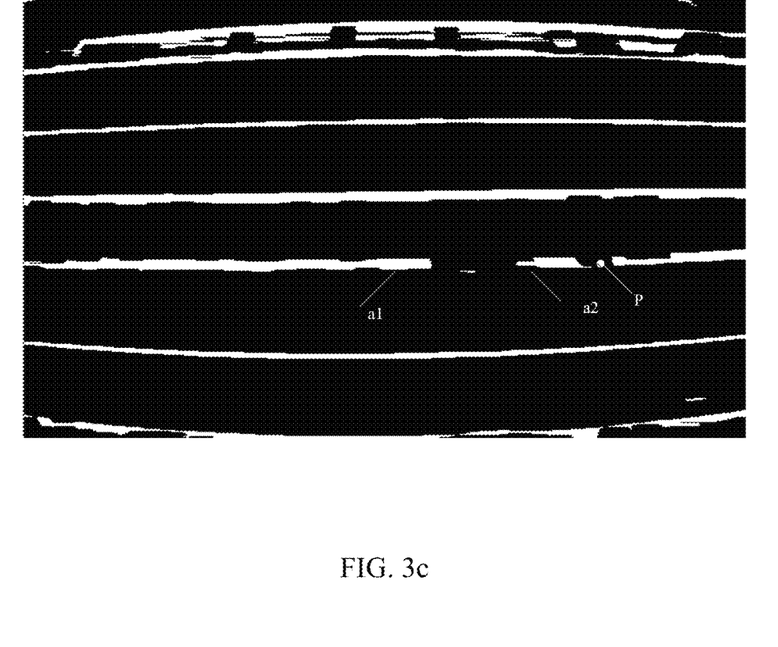
FIG. 3c is another monochrome image obtained from the monochrome image shown in FIG. 3b.
Figure 3D:
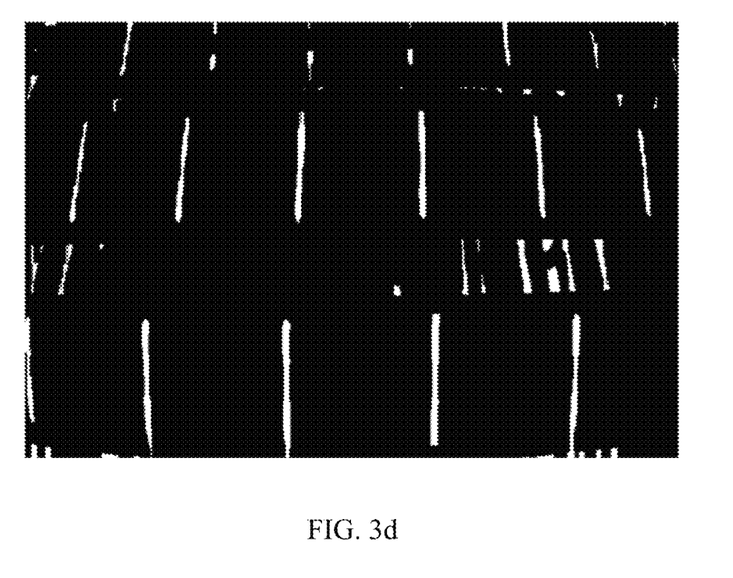
FIG. 3d is another monochrome image obtained from the monochrome image shown in FIG. 3b.

Further, in this embodiment, a 21*1 template and a 1*21 template are each implemented to etch the monochrome image shown in FIG. 3b, to obtain a FIG. 3c including only white horizontal lines and a FIG. 3d including only white vertical lines. As shown in FIG. 3c and FIG. 3d, in some scenarios, a horizontal line or a vertical line that should have been continuous will break, and this may cause errors during the process of searching an edge of the photovoltaic panel. In order to avoid the errors caused in the above situation, this embodiment may further provide a method of continuously processing the horizontal lines and vertical lines in the monochrome image for a preset number of times after obtaining the monochrome image. The specific processing method is as follows.

In a possible processing method, for each processing in the preset number of times, two lines in the same direction in the monochrome image are found. If extension lines of the two lines intersect in the monochrome image, and the distance between the two lines is less than a preset distance, then the two lines are two straight lines broken from one straight line. At this time, the two straight lines are connected. In this processing method, the above-mentioned preset distance and preset number of times can be set as needed, which is not specifically limited in this embodiment. Taking FIG. 3c as an example, a horizontal line a1 and a horizontal line a2 are on the same direction, and extension lines of the horizontal line a1 and the horizontal line a2 intersect as shown in FIG. 3c. Assuming that if the distance between the horizontal line a1 and the horizontal line a2 is smaller than the preset distance, then the horizontal line a1 and the horizontal line a2 are connected as shown in FIG. 3c to form a completed horizontal line, and to obtain FIG. 3e.

Figure 4:
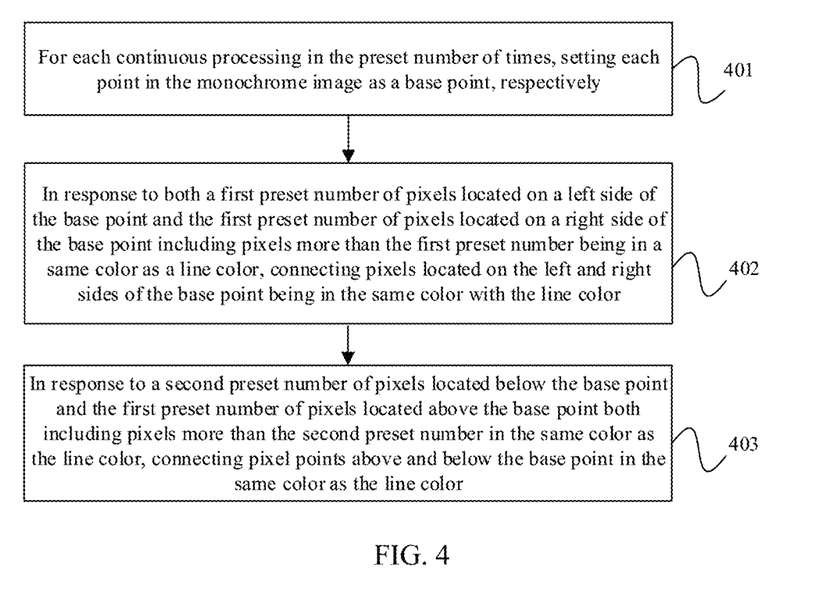
FIG. 4 is a flowchart of a continuous line processing method according to some embodiment of the present disclosure.

In another possible processing method, the processing method is shown in FIG. 4. FIG. 4 is a flowchart of a continuous line processing method according to some embodiment of the present disclosure. The method includes the following steps:

Step 401: For each continuous processing in the preset number of times, setting each point in the monochrome image as a base point, respectively.

Step 402: In response to both a first preset number of pixels located on a left side of the base point and the first preset number of pixels located on a right side of the base point including pixels more than the first preset number being in a same color as a line color, connecting pixels located on the left and right sides of the base point being in the same color with the line color.

Step 403: In response to a second preset number of pixels located below the base point and the first preset number of pixels located above the base point both including pixels more than the second preset number in the same color as the line color, connecting pixel points above and below the base point in the same color as the line color.

Figure 3E:
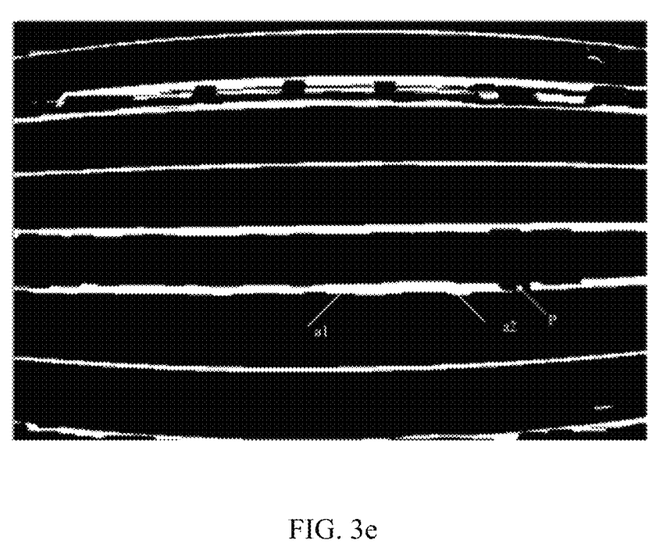
FIG. 3e is a monochrome image obtained after continuous processing of the image in FIG. 3c.
Figure 3F:
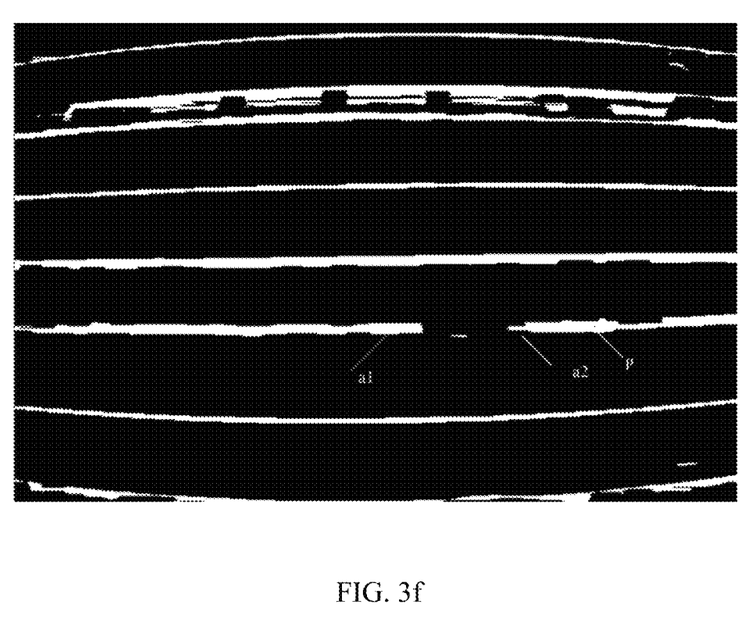
FIG. 3f is a monochrome image obtained after continuous processing of the image in FIG. 3c.

Still taking FIG. 3c as an example, assuming that for a pixel, P, of FIG. 3c, a total number of white pixels from 42 pixels on its left side are counted as A, a total number of white pixels from 42 pixels on its right side are counted as B, a total number of white pixels from 42 pixels above it are counted as C, and a total number of white pixels from pixels 42 below it are counted as D. If at the same time, both A and B exceed the first preset number, the white pixels located on the left and right sides of P are connected, which is repeated in the same way. After the preset number of continuous processing, the broken portion at P can be connected. Similarly, if both C and D exceed the second preset number, the white points located above and below P are connected. But from FIG. 3c, no breakage exists above and below P. Therefore, only the white pixels on the left and ride sides of P are connected, and the pixels above and below P are not connected. Accordingly, a monochrome image shown in FIG. 3f is obtained.

It should be noted that, in this embodiment the first preset number and the second preset number may be the same or different. The number of times of continuous processing (i.e., the above-described preset number of times) can be set as needed. In this embodiment, for example, the number of times of continuous processing may be determined based on the number of pixels selected (e.g., 42 pixels on a side of P). In general, when more pixels are selected, the times of continuous processing may be set to be less, and when less pixels are selected, the times of continuous processing may be set to be more. However, the description herein is merely exemplary, but not exclusive limitation to the present embodiment. In fact, in actual scenarios, the number of times for continuous processing may be set based on specific needs.

Optionally, to increase the visual processing effect, in the present embodiment, the monochrome image prior to continuous processing and the monochrome image after the continuous processing may be displayed. For example, they may be displayed as shown in FIGS. 3c and 3e (or FIG. 3f), may be displayed as shown in FIG. 3b or as an image obtained after continuous processing of the image FIG. 3b (including horizontal lines and vertical lines).

Step 103: Based on a relative positional relationship between the vertical lines and the horizontal lines in the monochrome image, identifying the photovoltaic panel from the monochrome image.

Optionally, the method of the present embodiment for identifying the photovoltaic panel in the monochrome image is as follows:

First, in the obtained monochrome image, searching for a first horizontal line that crosses more than three vertical lines. Among line segments of the first horizontal line divided by the vertical lines being crossed, the length ratio of two adjacent line segments being in a first preset range.

Figure 3G:
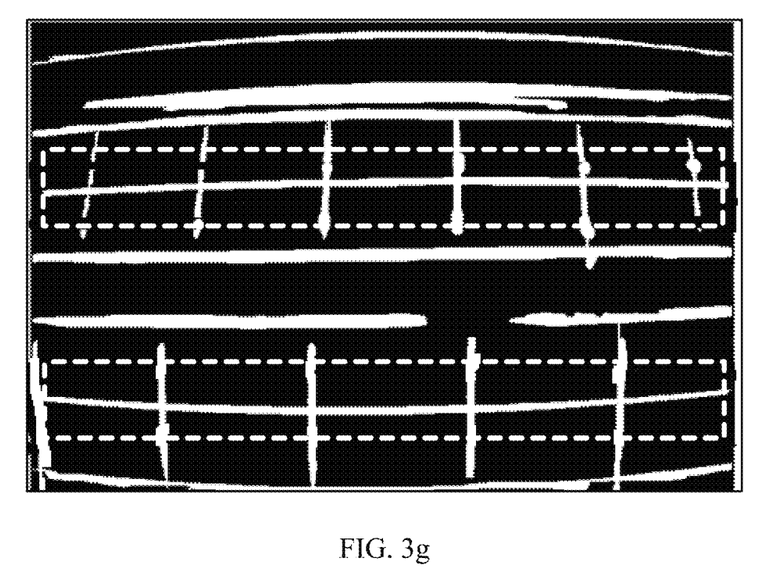
FIG. 3g is a monochrome image after marking a first horizontal line.

Optionally, as shown in FIG. 3g, after the first horizontal line is obtained, in this embodiment, the first horizontal line may be marked in the monochrome image, and the monochrome image with the mark may be displayed. As an example, in FIG. 3g, the first horizontal line is marked with a dashed frame, but in actual scenarios, the first horizontal line may not be limited to the form of a dashed frame, but may be set as needed.

Further, based on the first horizontal line, a second horizontal line is searched on both sides of the first horizontal line. The second horizontal line satisfies the following conditions:

In a possible condition, an average distance between the second horizontal line and endpoints of all vertical lines crossed by the first horizontal line near the second horizontal line is less than a preset pixel distance.

In another possible condition, an average distance between a point on the second horizontal line and the first horizontal line is within a second preset range.

Figure 3H:
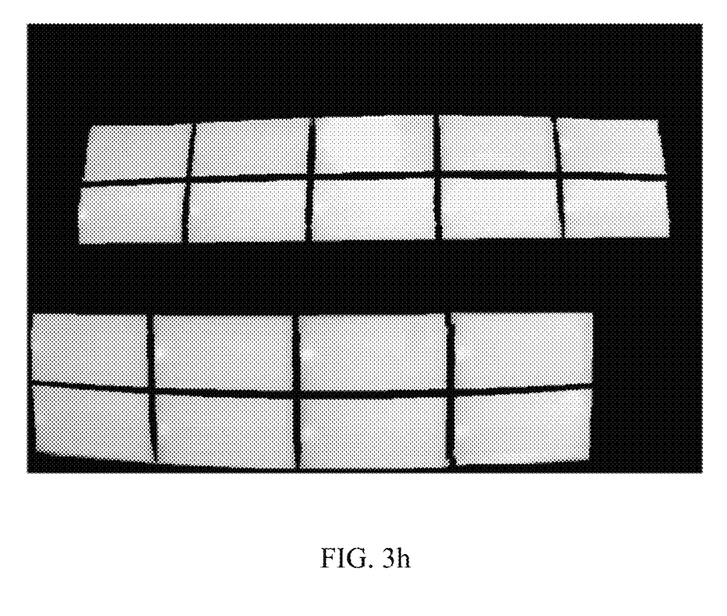
FIG. 3h is a monochrome image after identifying a photovoltaic panel.

Accordingly, an area formed by the first horizontal line, the second horizontal line, and the vertical lines crossed by the first horizontal line is an area where the photovoltaic panel is located. Taking FIG. 3b as an example, based on the monochrome image shown in FIG. 3b, the photovoltaic panel shown in FIG. 3h can be identified in FIG. 3b.

Figure 3I:
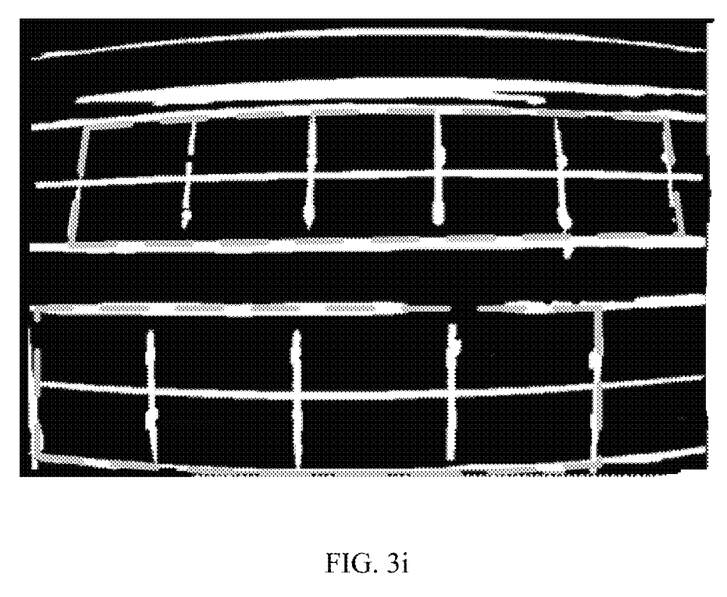
FIG. 3i is a monochrome image after marking the photovoltaic panel.

Optionally, as shown in FIG. 3i, after the photovoltaic panel is identified in the monochrome image, this embodiment may further provide a step of marking the area location having the photovoltaic panel in the monochrome image, and a step of displaying a monochrome image marked with this location. FIG. 3i shows an example of marking the photovoltaic panel in dashed frame, but it imposes no limitation to the form of the dashed frame in actual scenarios, and it may be in any form.

In the photovoltaic panel recognition method provided in this embodiment a grayscale image of an infrared image captured by a camera mounted on a UAV is obtained, and edge extraction processing is performed on the image in the grayscale image to obtain a monochrome image of multiple horizontal lines and multiple vertical lines, so that a photovoltaic panel is identified in the monochrome image based on the relative positional relationship between the horizontal lines and vertical lines in the monochrome image. As such, the photovoltaic panel in the electric field can be identified based on the infrared image captured by the UAV, and the purpose of inspecting the photovoltaic panel in the electric field by the UAV is achieved, thereby avoiding the waste of human resources caused by manual inspection. Compared with the existing manual inspection and inverter monitoring methods, the UAV inspection method has high inspection efficiency, and the malfunctioning photovoltaic panel can be timely and accurately identified from the identification of the photovoltaic panel, which can enhance electric field power generation, improve the safety of the power generation of the electric field, and avoid the losses caused by the accumulation of photovoltaic panel problems.

Figure 5:
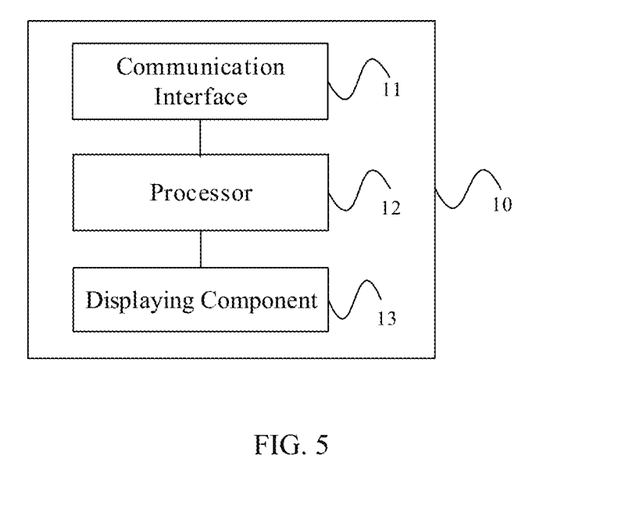
FIG. 5 is a schematic structural diagram of a ground station according to some embodiment of the present disclosure.

According to some embodiment of the present disclosure, a ground station is provided, and the ground station may be the ground station described in the foregoing embodiment. FIG. 5 is a schematic structural diagram of a ground station according to some embodiment of the present disclosure. As shown in FIG. 5, the ground station 10 includes: a communication interface 11 and one or more processors 12. The one or more processors operate individually or in collaboration, and the communication interface 11 is connected to the processor 12. The communication interface 11 is configured to: obtain a grayscale image of an infrared image captured by a camera mounted on the UAV, the grayscale image including an image of a photovoltaic panel. The processor 12 is configured to: perform edge extraction processing on the image in the grayscale image to obtain a monochrome image which includes a plurality of horizontal lines and a plurality of vertical lines. The horizontal lines are lines in a first direction, and an average of the lines in the first direction is greater than a preset length, the vertical lines are in a second direction, and an average length of the lines in the second direction is less than the preset length. The processor 12 is configured to identify the photovoltaic panel in the monochrome image based on a relative positional relationship between the horizontal lines and the vertical lines in the monochrome image.

Optionally, the processor 12 is configured to set a portion of the grayscale image having a grayscale value greater than a preset threshold to white based on a preset segmentation template and set a portion of the grayscale image having a grayscale value less than the preset threshold to black, to obtain a monochrome image including a plurality of horizontal lines and a plurality of vertical lines.

Optionally, the processor is further configured to perform continuous processing on the vertical lines and horizontal lines in the monochrome image for a preset number of times.

Optionally, the ground station 10 further includes a displaying component 13 which is communicatively connected to the processor 12. The displaying component 13 is configured to display a monochrome image before the continuous processing and display a monochrome image after the continuous processing.

Optionally, the processor 12 is configured to: search for a first horizontal line in the monochrome image, the first horizontal line crossing more than three vertical lines at the same time, and a length ratio of two adjacent line segments being within a first preset range among line segments divided by the crossed vertical lines; search for a second horizontal line on both sides of the first horizontal line, an average distance between the second horizontal line and endpoints of all the vertical lines crossed by the first horizontal line near the second horizontal line being less than a preset pixel distance, or an average distance between a point on the second horizontal line and the first horizontal line being within a second preset range; and determine an area formed by the first horizontal line, the second horizontal line, and a vertical line crossed by the first horizontal line to be an area where the photovoltaic panel is located.

Optionally, the processor 12 is configured to mark the first horizontal line in the monochrome image after obtaining the first horizontal line.

The display component 13 is configured to display a monochrome image with the mark.

Optionally, the processor 12 is configured to mark an area location having the photovoltaic panel in the monochrome image.

The display component 13 is configured to display a monochrome image marked with the location of the area.

The ground station provided in this embodiment can implement the technical solution of the embodiment in FIG. 1. The implementation manner and beneficial effects thereof are similar, and details are not described herein again.

The embodiment of the present disclosure further provides a ground station. Based on the embodiment of FIG. 5, the processor 12 is configured to: set each point in the monochrome image as a base point, respectively, for each continuous processing for the preset number of times; connect pixels located on the left and right sides of the base point in a same color with the line color if both a first preset number of pixels located on a left side of the base point and the first preset number of pixels located on a right side of the base point include pixels more than the first preset number being in the same color as a line color; and connect pixel points above and below the base point in the same color as the line color if a second preset number of pixels located below the base point and the first preset number of pixels located above the base point both include pixels more than the second preset number being in the same color as the line color.

Alternatively, the processor 12 is configured to connect the two lines, if extension lines of the two lines intersect in the monochrome image, and the distance between the two lines is less than a preset distance.

The ground station provided by this embodiment can implement the technical solution of the embodiment in FIG. 4. The implementation manner and beneficial effects thereof are similar, and details are not described herein again.

Figure 6:
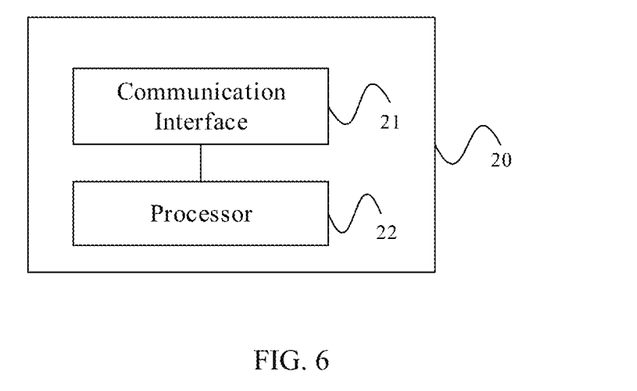
FIG. 6 is a schematic structural diagram of a control apparatus according to some embodiment of the present disclosure.

According to some embodiment of the present disclosure, a control apparatus is provided. Referring to FIG. 6, FIG. 6 is a schematic structural diagram of a control apparatus according to some embodiment of the present disclosure. As shown in FIG. 6, the control apparatus 20 includes a communication interface 21 and one or more processors 22. The one or more processors work individually or in collaboration, and the communication interface 21 is connected to the processor 22. The communication interface 21 is configured to obtain a grayscale image of the infrared image captured by the camera mounted on the UAV, the grayscale image including an image of a photovoltaic panel. The processor 22 is configured to perform edge extraction processing on the image in the grayscale image to obtain a monochrome image including a plurality of horizontal lines and a plurality of vertical lines. The horizontal lines are lines in a first direction, and an average length of the lines in the first direction is greater than a preset length. The vertical lines are lines in a second direction, and an average length of the lines in the second direction is less than the preset length. The processor 22 is configured to identify the photovoltaic panel in the monochrome image based on a relative positional relationship between the horizontals and the vertical lines in the monochrome image.

Optionally, the processor 22 is configured to: set a portion of the grayscale image having a grayscale value greater than a preset threshold to be white based on a preset segmentation template, and set a portion having a grayscale value less than the preset threshold to black, to obtain a monochrome image including a plurality of horizontal lines and a plurality of vertical lines.

Optionally, the processor 22 is further configured to perform continuous processing on the vertical lines and the horizontal lines in the monochrome image for a preset number of times.

Optionally, the processor 22 is configured to search for a first horizontal line in the monochrome image, the first horizontal line crossing more than three vertical lines at the same time. Among the line segments divided by the vertical lines being crossed, a length ratio between two adjacent line segments is within a first preset range. The processor 22 is further configured to search for a second horizontal line on both sides of the first horizontal line. An average distance between the second horizontal line and endpoints of all the vertical lines crossed by the first horizontal line near the second horizontal line is less than a preset pixel distance, or an average distance between a point of the second horizontal line and the first horizontal line is within a second preset range. The processor 22 is further configured to determine an area formed by the first horizontal line, the second horizontal line, and the vertical lines crossed by the first horizontal line to be an area where the photovoltaic panel is located.

Optionally, the processor 22 is configured to mark the first horizontal line in the monochrome image after obtaining the first horizontal line.

Optionally, the processor 22 is configured to mark an area location having the photovoltaic panel in the monochrome image.

The control apparatus provided in this embodiment can implement the technical solution of the embodiment in FIG. 1, and the implementation manner and beneficial effects are similar, and are not described herein again.

The embodiment of the present disclosure further provides a control apparatus. Based on the embodiment in FIG. 6, the processor 22 is further configured to: set each point in the monochrome image as a base point, respectively, for each continuous processing; connect pixels located on the left and right sides of the base point in a same color with the line color if both a first preset number of pixels located on a left side of the base point and the first preset number of pixels located on a right side of the base point include pixels more than the first preset number being in the same color as a line color; and connect pixel points above and below the base point in the same color as the line color if a second preset number of pixels located below the base point and the first preset number of pixels located above the base point both include pixels more than the second preset number being in the same color as the line color.

Alternatively, the processor 22 is further configured to connect the two lines, if extension lines of the two lines intersect in the monochrome image, and the distance between the two lines is less than a preset distance.

The control apparatus provided in this embodiment can implement the technical solution of the embodiment in FIG. 4. The implementation manner and beneficial effects thereof are similar, and details are not described herein again.

Some embodiment of the present disclosure provides a UAV. The UAV includes: a body, a power system mounted on the body for supplying flight power, an infrared camera mounted on the body for capturing infrared images, and the control apparatus according to the above embodiment.

The implementation method and beneficial effects of the UAV provided by this embodiment are the same as those of the control apparatus involved in the foregoing embodiment, and details are not described herein again.

In some embodiments provided by the present disclosure, it can be understood that the disclosed apparatus and method may be implemented in other ways. For example, the device embodiments described above are only schematic. For example, the division of the unit is only a logical function division. In actual implementation, there may be other division manners. For example, multiple units or components may be combined or may be integrated into another system, or some features can be ignored or not implemented. In addition, a mutual coupling or direct coupling or connection, as shown or discussed, may be through indirect coupling or connection of some interfaces, devices or units, which may be electrical, mechanical or other forms.

The units described as separate components may or may not be physically separated, and the components displayed as units may or may not be physical units, that is, may be located in one place, or may be distributed on multiple network units. Some or all of the units may be selected according to actual needs to achieve the objective of the solution of this embodiment.

In addition, each functional unit in each embodiment of the present disclosure may be integrated into one processing unit, or each unit may exist separately physically, or two or more units may be integrated into one unit. The above integrated unit may be implemented in the form of hardware, or in the form of hardware plus software functional units.

The above integrated unit implemented in the form of a software functional unit may be stored in a computer-readable storage medium. The above software functional unit is stored in a storage medium, including several instructions for causing a computer device (which may be a personal computer, a server, or a network device) or a processor to implement the methods described in the embodiments of the present disclosure Some steps. The foregoing storage medium includes: flash drive, movable hard disks, read-only memory (ROM), random-access memory (RAM), magnetic disks or optical disks, and other mediums that can store program codes.

Those skilled in the art can clearly understand that for the convenience and brevity of the description, only the division of the above-mentioned functional modules is taken as an example. In actual applications, the above-mentioned functions can be allocated by different functional modules according to needs, that is, an internal structure of the device is divided into different functional modules to complete all or portion of the functions described above. For the specific operating process of the device described above, reference may be made to the corresponding process in the foregoing method embodiments, and details are not described herein again.

Finally, it should be noted that the above embodiments are only used to illustrate but not to limit the technical solution of the present disclosure. Although the present disclosure has been described in detail with reference to the foregoing embodiments, those skilled in the art should understand that the technical solutions described in the foregoing embodiments can still be modified, or some or all of the technical features can be equivalently substituted; and these modifications or substitutions do not cause the essence of the corresponding technical solutions to depart from the range of the technical solutions of present disclosure.

What is claimed is:

1. A method for identifying a photovoltaic panel, comprising:
   acquiring a grayscale image of an infrared image captured by a camera mounted on a UAV, the grayscale image including an image of a photovoltaic panel;
   performing edge extraction processing on an image in the grayscale image to obtain a monochrome image including a plurality of horizontal lines and a plurality of vertical lines, the horizontal lines being lines in a first direction, an average length of the lines in the first direction being greater than a preset length, the vertical lines being lines in a second direction, and an average length of the lines in the second direction being less than the preset length; and
   identifying the photovoltaic panel in the monochrome image based on a relative positional relationship between the horizontal lines and the vertical lines in the monochrome image.

2. The method according to claim 1, further comprising:
   setting a portion of the grayscale image having a grayscale value greater than a preset threshold to white based on a preset segmentation template, and setting a portion of the grayscale image having a grayscale value less than the preset threshold to black to obtain a monochrome image including the plurality of horizontal lines and the plurality of vertical lines.

3. The method according to claim 1, further comprising:
performing continuous processing on the vertical lines and the horizontal lines in the monochrome image for a preset number of times based on the relative positional relationship between the horizontal lines and the vertical lines in the monochrome image before identifying the photovoltaic panel in the monochrome image.

4. The method according to claim 3, further comprising:
setting each point in the monochrome image as a base point for each continuous processing;
connecting pixels located on the left and right sides of the base point in a same color with the line color in response to both a first preset number of pixels located on a left side of the base point and the first preset number of pixels located on a right side of the base point including pixels more than the first preset number being in the same color as a line color; and
connecting pixel points above and below the base point in the same color as the line color in response to both a second preset number of pixels located below the base point and the first preset number of pixels located above the base point including pixels more than the second preset number being in the same color as the line color.

5. The method according to claim 3, further comprising:
connecting two lines into one line, for each continuous processing, in response to extension lines of the two lines intersecting in the monochrome image and the distance between the two lines being less than a preset distance.

6. The method according to claim 3, further comprising:
displaying a monochrome image before the continuous processing and displaying a monochrome image after the continuous processing.

7. The method according to claim 6, further comprising:
searching for a first horizontal line in the monochrome image, the first horizontal line crossing more than three vertical lines, and a length ratio between two adjacent line segments being within a first preset range among the line segments divided by the vertical lines being crossed;
searching for a second horizontal line on both sides of the first horizontal line, an average distance between the second horizontal line and endpoints of all the vertical lines crossed by the first horizontal line near the second horizontal line being less than a preset pixel distance, or an average distance between a point of the second horizontal line and the first horizontal line being within a second preset range; and
determining an area formed by the first horizontal line, the second horizontal line, and the vertical lines crossed by the first horizontal line to be an area having the photovoltaic panel.

8. The method according to claim 7, further comprising:
in response to finding the first horizontal line, marking the first horizontal line in the monochrome image; and
displaying a monochrome image with the mark.

9. The method according to claim 1, further comprising:
marking an area location having the photovoltaic panel in the monochrome image; and
displaying the monochrome image marked with the area location.

10. A ground station, comprising:
a communication interface, configured to obtain a grayscale image of an infrared image captured by a camera mounted on the UAV, the grayscale image including an image of a photovoltaic panel; and
one or more processors, the one or more processors operating individually or in collaboration, and the communication interface being connected to the processor, the processor being configured to:
perform edge extraction processing on an image in the grayscale image to obtain a monochrome image including a plurality of horizontal lines and a plurality of vertical lines, the horizontal lines being lines in a first direction, an average length of the lines in the first direction being greater than a preset length, the vertical lines being lines in a second direction, and an average length of the lines in the second direction being less than the preset length; and
identify the photovoltaic panel in the monochrome image based on a relative position relationship between the horizontal lines and the vertical lines in the monochrome image.

11. The ground station according to claim 10, wherein the processor is further configured to set a portion of the grayscale image having a grayscale value greater than a preset threshold to white based on a preset segmentation template and a portion of the grayscale image having a grayscale value less than the preset threshold to black, to obtain a monochrome image including a plurality of horizontal lines and a plurality of vertical lines.

12. The ground station according to claim 10, wherein the processor is further configured to perform continuous processing on the vertical lines and the horizontal lines in the monochrome image for a preset number of times.

13. The ground station according to claim 12, wherein the processor is configured to:
setting each point in the monochrome image as a base point for each continuous processing;
connecting pixels located on the left and right sides of the base point being in a same color with the line color in response to both a first preset number of pixels located on a left side of the base point and the first preset number of pixels located on a right side of the base point including pixels more than the first preset number being in the same color as a line color; and
connecting pixel points above and below the base point being in the same color as the line color in response to being a second preset number of pixels located below the base point and the first preset number of pixels located above the base point both including pixels more than the second preset number being in the same color as the line color.

14. The ground station according to claim 12, wherein the processor is further configured to connect two lines into one line, for each continuous processing, in response to extension lines of the two lines intersecting in the monochrome image and the distance between the two lines being less than a preset distance.

15. The ground station according to claim 12, further comprising: a displaying component, the displaying component being connected to the processor, configured to display a monochrome image before the continuous processing and display a monochrome image after the continuous processing.

16. The ground station according to claim 15, wherein the processor is configured to:
search for a first horizontal line in the monochrome image, the first horizontal line crossing more than three vertical lines, and a length ratio between two adjacent line segments being within a first preset range among the line segments divided by the vertical lines being crossed;

search for a second horizontal line on both sides of the first horizontal line, an average distance between the second horizontal line and endpoints of all the vertical lines crossed by the first horizontal line near the second horizontal line being less than a preset pixel distance, or an average distance between a point of the second horizontal line and the first horizontal line being within a second preset range; and determine an area formed by the first horizontal line, the second horizontal line, and the vertical lines crossed by the first horizontal line to be an area having the photovoltaic panel.

17. The ground station according to claim 16, wherein:

the processor is configured to mark the first horizontal line in the monochrome image after obtaining the first horizontal lines; and the displaying component is configured to display a monochrome image with the mark.

18. The ground station according to claim 10, wherein:

the processor is configured to mark the area location having the photovoltaic panel in the monochrome image; and the displaying component is configured to display the monochrome image marked with the area location.

* * * * *